Jan. 3, 1950

S. E. BARTELSON 2,493,056

FILM POSITIONING DRUM

Filed Sept. 28, 1946

INVENTOR.
Sten E. Bartelson
BY
ATTORNEY

Patented Jan. 3, 1950

2,493,056

UNITED STATES PATENT OFFICE 2,493,056

FILM POSITIONING DRUM

Sten E. Bartelson, Ashland, N. J., assignor to Radio Corporation of America, a corporation of Delaware Application September 28, 1946, Serial No. 700,062

7 Claims. (Cl. 271—2.3)

This invention relates to motion picture apparatus, and particularly to film advancing or driving mechanisms.

It is well-known, in the art of sound motion picture production and reproduction, that one of the important factors is the advancement of sound film at a constant, uniform speed past a recording or reproducing light beam. In sound recording, a modulated light beam is projected onto a light sensitive emulsion to produce a sound record. In sound reproduction, a light beam of constant intensity is projected on the sound track area of the film and the light so modulated and emerging through the sound track is then impressed upon a light sensitive element, such as a photoelectric cell. Thus, in reproduction, the advancing mechanism is arranged so that light may be transmitted through the film at the translation point.

To produce a uniform film motion at the translation point, many film drives have been proposed and used. Each of these drives utilizes some form of inertia device and damping means to eliminate speed fluctuations, arising at other drive points in the film path, from affecting the speed of the film at the translation point. Many of these damping and filtering systems are elaborate and expensive. Furthermore, various types of edge guiding systems have been proposed and used to prevent lateral weaving of the film and sound track as the film is advanced past the light beam.

The present invention is directed to a type of film drive which simplifies the film path while producing a stable film motion. It utilizes a solid flywheel, although other types could be used, on the shaft of a film pulled drum utilizing a pressure roller at the entrance of the film on the drum. The drum's construction is such as to provide a positive pressure transversely of the film to maintain the sound track at a fixed lateral position with respect to the light beam and also to provide a tight wrap of the film around the drum at all times to maintain it in focus. The latter function is accomplished without the use of tensioned rollers or other filter means. With a construction which provides a positive and constant pressure against the edge of the film, a pressure on the film toward the surface of the drum is obtained during its complete travel over the drum.

The principal object of the invention, therefore, is to facilitate the advancement of film past or through a light beam at a constant uniform speed.

Another object of the invention is to provide an improved film pulled drum which edge guides the film and places a constant pressure on the surface thereof during its passage over the drum.

A further object of the invention is to provide a simplified film pulled roller which provides both edge guiding, tensioning, and filtering of the film.

A still further object of the invention is to provide an improved edge guiding and tensioning system for a film pulled drum.

A still further object of the invention is to provide continuous pressure between the film and a film pulled roller in addition to the pressure resulting from tension on the film.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
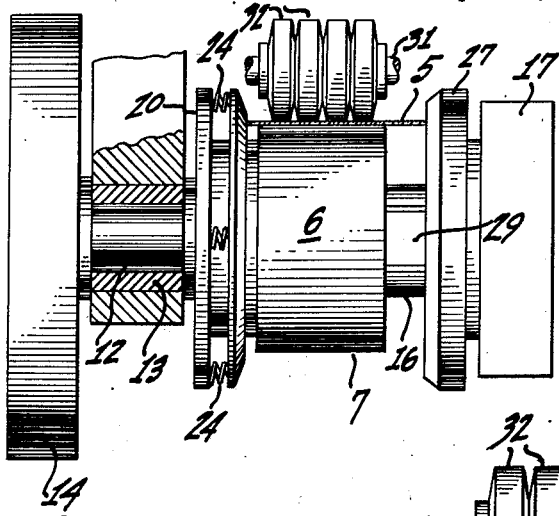
Fig. 1 is a side view of a film pulled roller embodying the invention.
Figure 2:
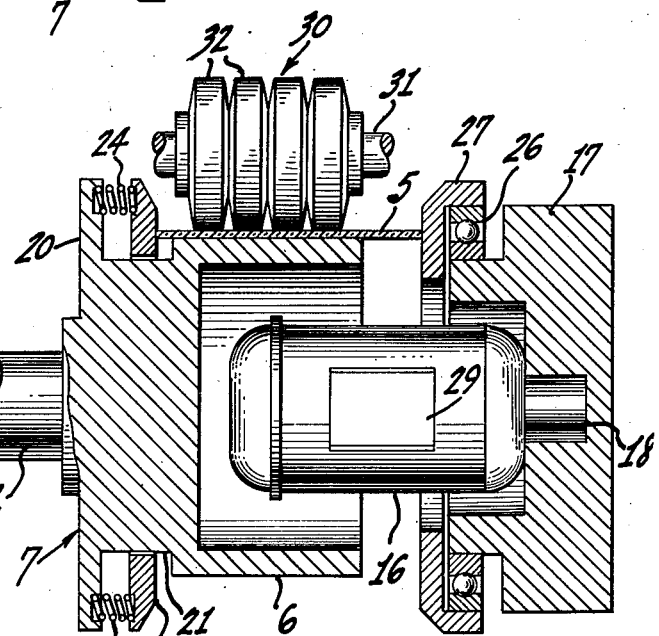
Fig. 2 is a cross-sectional view of the roller of the invention.
Figure 3:
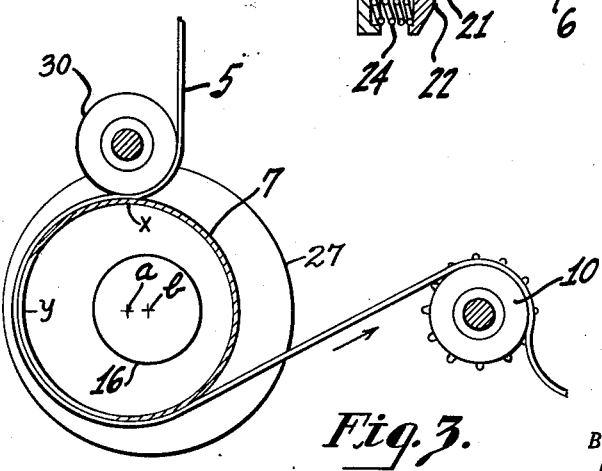
Fig. 3 is a diagrammatic view of the film path over the roller of the invention.

Referring to the drawings, in which the same numerals identify like elements, a film 5 is shown passing over the surface 6 of the drum 7 in the direction of the arrow, under a pressure roller 30, the amount of the surface 6 being contacted by the film being shown in Fig. 3. In this figure, a drive sprocket 10 is shown pulling the film over the roller 7.

The roller 7 is mounted on a shaft 12 adapted to rotate in a bearing 13 and having a solid flywheel 14 mounted on one end thereof. It is to be understood that a rotary stabilizer or oil damped flywheel may also be used instead of the solid flywheel 14. The roller 7 is cup shaped to accommodate a photoelectric cell 16 supported in a mounting plate 17, the output of the cell being transmitted over conductors 18. The drum has a fixed flange 20 integral with the body portion of the drum, and, mounted in an annular recess 21 of the drum, is a guide flange 22, which is urged toward the hollow portion of the drum by a series of coil springs 24 mounted in recesses in the fixed flange 20 and the movable guide flange 22.

Mounted for rotation on an annular ball bearing 26 is a guide flange 27, stationary with respect to axial movement, the right edge of the film 5 being urged and held firmly against the face of the flange 27 by the spring pressed guide flange 22. With the sound track portion of the film between the drum 7 and the flange 27, this area will remain in a fixed position with respect to the window 29 of the photoelectric cell 16, the light beam being impressed on the film opposite the window 29.

As shown in Fig. 3, the center $a$ represents the axis of rotation of the surface 6 of the drum 7, while the center $b$ represents the rotational axis of the flange 27. By separating these two rotational axes, but maintaining them parallel, the flange 27 slides across the edge of the film 5 pressing the film against the surface 6 of the drum 7, the region of maximum pressure being between points $x$ and $y$. The point of impression of the light beam on the film should be in this region. This action prevents slippage of the film on the surface 6 and maintains the sound track in focus. That is, the surface of the film remains fixed with respect to the light beam being projected on the sound track area of the film. This pressure effect may be increased by making the diameter of the guide flange 27 considerably larger than the diameter of the surface 6, since this permits the axes of rotation to be separated a greater distance. By using either the difference in diameters or the offsetting of the rotational axes of the flange 27 and the surface 6, or both, the friction caused by the different peripheral speeds of the guide flange 27 and the film also provides damping of the oscillations of the flywheel 14 due to the elasticity of the film. It is thus unnecessary to use mechanical filtering devices and the simple film path, as illustrated in Fig. 3, is obtained.

To guide the film to the surface 6, a multiple section roller 30 is used. This roller is mounted on a shaft 31, the sections 32 thereof being disc shaped with flattened outer surfaces and of resilient material, such as synthetic rubber. It has been found that such a multiple disc pressure roller provides better guiding and film contact with the surface 6 than a continuous surface roller.

I claim:

1. A film drive mechanism comprising a sprocket adapted to advance film, a shaft, a drum fixed to said shaft and adapted to have film pulled thereover by said sprocket, a flange mounted adjacent one end of said drum and adapted to be rotated by film pulled over said drum, and a movable flange mounted on said drum, said flange being resiliently urged toward said first mentioned flange, the rotational axes of said first mentioned flange and said drum being separated and parallel.

2. A film drive mechanism comprising a rotatable shaft, a hollow-ended drum mounted on said shaft, a fixed flange on said drum, a movable flange mounted on said drum and resiliently urged toward the hollow end of said drum, and a flange mounted for rotation adjacent the hollow end of said drum and spaced therefrom, film passing over the surface of said drum being urged toward said third mentioned flange by said movable flange, the axis of rotation of said third mentioned flange being separated from the axis of rotation of said movable flange.

3. A film drive for advancing film at a constant speed past a light beam comprising a drum having a hollow end portion and a shaft portion, a flange movable axially on said drum, means for resiliently urging said flange toward the hollow end portion of said drum, an annular flange mounted for rotation adjacent the hollow end portion of said drum, the axis of rotation of said annular flange being eccentric with respect to the axis of rotation of the surface of said drum, means for maintaining a film on the surface of said drum at one point intermediate said flanges, and means for pulling said film over said drum, the eccentricity of the axes of rotation of said drum and said flange producing a pressure on said film toward a portion of the surface of said drum.

4. A film drive mechanism comprising means for advancing film longitudinally, a drum over which said film passes and which is rotated by the friction between the surface of said drum and said film, an annular flange spaced from said drum and rotatable by contact with the edge of said moving film, and means on said drum to urge said film transversely toward said flange, the axes of rotation of said drum and said flange being parallel and separated from each other to produce a force on said film toward a portion of the surface of said drum.

5. A film drive mechanism comprising a drum having a certain axis of rotation, means for advancing a film over the surface of said drum, a rotatable flange against which one edge of said film abuts, said flange having an axis of rotation parallel with, but separated from, the axis of rotation of said drum, and means for maintaining said edge of said film in contact with a portion of said flange.

6. A film drive mechanism in accordance with claim 5, in which a second flange is provided against which the other edge of said film abuts, the axis of rotation of said second flange being concentric with the axis of rotation of said drum.

7. A film drive mechanism in accordance with claim 5, in which a second flange having an axis concentric with that of said drum is provided on said drum and adapted to bear against the other edge of said drum, resilient means being provided for urging said second flange against said other edge of said film.

STEN E. BARTELSON.

REFERENCES CITED

The following references are of record in the file of this patent:

UNITED STATES PATENTS

| Number | Name | Date |
|---|---|---|
| 1,768,403 | Heisler | June 24, 1930 |
| 1,818,502 | Owens | Aug. 11, 1931 |
| 1,866,528 | Ebeling | July 12, 1932 |
| 1,886,540 | Grant | Nov. 8, 1932 |
| 2,033,277 | Elmer et al. | Mar. 10, 1936 |
| 2,168,572 | Landis | Aug. 8, 1939 |